United States Patent
Savitskyy et al.

(10) Patent No.: US 9,395,853 B2
(45) Date of Patent: Jul. 19, 2016

(54) REDUCING COMMON MODE NOISE IN TOUCH APPLICATIONS

(71) Applicant: Parade Technologies, Ltd., Santa Clara, CA (US)

(72) Inventors: Oleksiy Savitskyy, Busk (UA); Andriy Maharyta, Lviv (UA); Ihor Musijchuk, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/023,342

(22) Filed: Sep. 10, 2013

(65) Prior Publication Data
US 2014/0062953 A1    Mar. 6, 2014

Related U.S. Application Data

(63) Continuation of application No. 14/018,360, filed on Sep. 4, 2013, now abandoned.

(60) Provisional application No. 61/835,306, filed on Jun. 14, 2013, provisional application No. 61/697,046, filed on Sep. 5, 2012.

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC .................... G06F 3/041; G06F 3/044; G06F 2203/04107; G06F 2203/04111
USPC ...................... 345/173–174; 178/18.01–20.04
See application file for complete search history.

(56) References Cited

U.S. PATENT DOCUMENTS

| | | | |
|---|---|---|---|
| 5,543,588 | A | 8/1996 | Bisset et al. |
| 5,543,591 | A | 8/1996 | Gillespie et al. |
| 5,825,352 | A | 10/1998 | Bisset et al. |

(Continued)

FOREIGN PATENT DOCUMENTS

EP    0777875 A    6/1997

OTHER PUBLICATIONS

U.S. Appl. No. 13/912,028: "Assigning Issues to Technical Support Groups Based on Skill and Product Knowledge," Andriy Maharyta et al., filed Jun. 6, 2013; 38 pages.

(Continued)

*Primary Examiner* — Kenneth Bukowski
(74) *Attorney, Agent, or Firm* — Morgan, Lewis & Bockius LLP

(57) ABSTRACT

A processing device performs a first scan of a first plurality of electrodes along a first axis in a capacitive sense array to generate a first plurality of capacitance values corresponding to a mutual capacitance at electrode intersections of the capacitive sense array. The processing device performs a second scan of a second plurality of electrodes along a second axis in the capacitive sense array to generate a second plurality of capacitance values corresponding to the mutual capacitance at the electrode intersections of the capacitive sense array. The processing device determines a first coordinate of a conductive object proximate to the capacitive sense array based on the a first subset of first plurality of signals and a second coordinate of the conductive object based on a second subset of the second plurality of signals.

20 Claims, 9 Drawing Sheets

| | C1 | C2 | C3 | C4 | C5 | C6 | C7 | C8 | C9 | ... | Cn |
|---|---|---|---|---|---|---|---|---|---|---|---|
| R1  | 0 | 0 | 0 | 0 | 0   | 0   | 0   | 0 | 0 | ... | 0 |
| R2  | 0 | 0 | 0 | 0 | 0   | 0   | 0   | 0 | 0 | ... | 0 |
| R3  | 0 | 0 | 0 | 0 | 0   | 172 | 0   | 0 | 0 | ... | 0 |
| R4  | 0 | 0 | 0 | 0 | 199 | 311 | 146 | 0 | 0 | ... | 0 |
| R5  | 0 | 0 | 0 | 0 | 211 | 292 | 147 | 0 | 0 | ... | 0 |
| R6  | 0 | 0 | 0 | 0 | 0   | 140 | 0   | 0 | 0 | ... | 0 |
| R7  | 0 | 0 | 0 | 0 | 0   | 0   | 0   | 0 | 0 | ... | 0 |
| R8  | 0 | 0 | 0 | 0 | 0   | 0   | 0   | 0 | 0 | ... | 0 |
| R9  | 0 | 0 | 0 | 0 | 0   | 0   | 0   | 0 | 0 | ... | 0 |
| R10 | 0 | 0 | 0 | 0 | 0   | 0   | 0   | 0 | 0 | ... | 0 |
| R11 | 0 | 0 | 0 | 0 | 0   | 0   | 0   | 0 | 0 | ... | 0 |
| R12 | 0 | 0 | 0 | 0 | 0   | 0   | 0   | 0 | 0 | ... | 0 |
| R13 | 0 | 0 | 0 | 0 | 0   | 0   | 0   | 0 | 0 | ... | 0 |
| R14 | 0 | 0 | 0 | 0 | 0   | 0   | 0   | 0 | 0 | ... | 0 |
| ... | ... | ... | ... | ... | ... | ... | ... | ... | ... | ... | ... |
| Rm  | 0 | 0 | 0 | 0 | 0   | 0   | 0   | 0 | 0 | ... | 0 |

TABLE 600

(56) References Cited

U.S. PATENT DOCUMENTS

| | | | |
|---|---|---|---|
| 8,416,209 B2 | 4/2013 | Hotelling et al. | |
| 8,441,453 B2 | 5/2013 | Westerman et al. | |
| 2007/0229466 A1* | 10/2007 | Peng et al. | 345/173 |
| 2009/0184934 A1* | 7/2009 | Lin et al. | 345/173 |
| 2009/0267916 A1 | 10/2009 | Hotelling | |
| 2009/0273579 A1 | 11/2009 | Zachut et al. | |
| 2010/0044122 A1 | 2/2010 | Sleeman et al. | |
| 2010/0073325 A1* | 3/2010 | Yang | 345/174 |
| 2010/0193258 A1 | 8/2010 | Simmons et al. | |
| 2011/0115729 A1 | 5/2011 | Kremin et al. | |
| 2011/0254802 A1 | 10/2011 | Philipp | |
| 2011/0304585 A1 | 12/2011 | Chang et al. | |
| 2012/0044199 A1* | 2/2012 | Karpin et al. | 345/174 |
| 2012/0050216 A1* | 3/2012 | Kremin et al. | 345/174 |
| 2012/0068964 A1 | 3/2012 | Wright et al. | |
| 2012/0086671 A1 | 4/2012 | Brown et al. | |
| 2012/0139867 A1 | 6/2012 | Chang et al. | |
| 2012/0154322 A1 | 6/2012 | Yang et al. | |
| 2012/0206407 A1 | 8/2012 | Taylor et al. | |
| 2012/0229417 A1 | 9/2012 | Badaye | |
| 2012/0268415 A1 | 10/2012 | Konovalov et al. | |
| 2013/0076646 A1 | 3/2013 | Krah et al. | |
| 2013/0076675 A1 | 3/2013 | Shin et al. | |
| 2013/0082719 A1 | 4/2013 | Prendergast et al. | |
| 2014/0035832 A1* | 2/2014 | Poulsen | 345/173 |

OTHER PUBLICATIONS

Cypress Semiconductor Corp., Capsense Sigma-Delta Data Sheet, Document No. 001-45840 Rev. *A, revised Feb. 18, 2009, 48 pages.
International Search Report for International Application No. PCT/US13/58147 dated Mar. 18, 2014; 2 pages.
International Search Report for International Application No. PCT/US14/18760 dated Apr. 21, 2014; 3 pages.
Newelectronics; "CES 2012: Touchscreen controllers set new standards of performance". (retrieved from www.newelectronics.co.uk/electronics-news/ces-2012-touchscreen-controllers-set-new-standards-of-performance/39401/ on Apr. 30, 2013), 2 pages.
Search Report for "Eliminating Common Mode Noise in Touch Applications", May 3, 2013, 14 pages.
USPTO Advisory Action for U.S. Appl. No. 13/912,028 dated Dec. 5, 2013; 3 pages.
USPTO Final Rejection for U.S. Appl. No. 13/912,028 dated Oct. 18, 2013; 11 pages.
USPTO Non-Final Rejection for U.S. Appl. No. 13/912,028 dated Aug. 1, 2013; 12 pages.
Written Opinion of the International Searching Authority for International Application No. PCT/US13/58147 dated Mar. 18, 2014; 7 pages.
Written Opinion of the International Searching Authority for International Application No. PCT/US14/18760 dated Apr. 21, 2014; 7 pages.
U.S. Appl. No. 14/018,360, "Reducing Common Mode Noise in Touch Applications," Oleksiy Savitsky et al, filed Sep. 4, 2013, 40 pgs.
USPTO Office Action for U.S. Appl. No. 13/912,028 dated Mar. 25, 2014, 14 pgs.
USPTO Notice of Allowance for U.S. Appl. No. 13/912,028 dated Jan. 7, 2015, 7 pgs.
USPTO Notice of Allowance for U.S. Appl. No. 13/912,028 dated Mar. 30, 2015, 7 pgs.
USPTO Office Action for U.S. Appl. No. 14/018,360 dated Oct. 21, 2014, 23 pgs.

\* cited by examiner

| | C1 | C2 | C3 | C4 | C5 | C6 | C7 | C8 | C9 | ... | Cn |
|---|---|---|---|---|---|---|---|---|---|---|---|
| R1 | 2 | 3 | -8 | -6 | -32 | -73 | -46 | -3 | 2 | ... | -1 |
| R2 | 1 | 2 | 5 | 6 | 26 | 49 | 30 | 9 | 5 | ... | 0 |
| R3 | -1 | 3 | -1 | 1 | 44 | 114 | 67 | 15 | 3 | ... | 1 |
| R4 | -4 | -2 | -3 | -6 | 62 | 116 | 91 | 5 | -1 | ... | 0 |
| R5 | 3 | 2 | 1 | -7 | 68 | 95 | 84 | 10 | 3 | ... | 7 |
| R6 | 0 | -2 | -1 | 4 | 27 | 73 | 37 | 7 | 4 | ... | 2 |
| R7 | -1 | -1 | -5 | -3 | 35 | 69 | 47 | 2 | 1 | ... | 1 |
| R8 | -7 | -1 | -1 | -5 | -14 | -33 | -28 | -1 | -3 | ... | 0 |
| R9 | -5 | -1 | -10 | -2 | -34 | -67 | -49 | -8 | -11 | ... | -1 |
| R10 | -1 | 1 | -5 | 1 | -7 | -15 | -8 | -1 | 1 | ... | 2 |
| R11 | -2 | 1 | -7 | 2 | 31 | 63 | 45 | 9 | -2 | ... | 0 |
| R12 | -4 | -5 | -8 | 8 | -3 | 6 | 0 | -5 | -4 | ... | -2 |
| R13 | 2 | 2 | 1 | 1 | -28 | -58 | -44 | -6 | -2 | ... | -3 |
| R14 | 3 | 1 | 7 | 3 | -13 | -34 | -26 | 4 | 3 | ... | 1 |
| ... | ... | ... | ... | ... | ... | ... | ... | ... | ... | ... | ... |
| Rm | 0 | 1 | 2 | -6 | 14 | 22 | 14 | 2 | 1 | ... | -3 |

TABLE 400

| TABLE 500 | C1 | C2 | C3 | C4 | C5 | C6 | C7 | C8 | C9 | ... | Cn |
|---|---|---|---|---|---|---|---|---|---|---|---|
| R1 | 5 | 5 | -2 | -4 | -3 | 7 | 3 | 2 | 4 | ... | 0 |
| R2 | 8 | 8 | -1 | -5 | -3 | 5 | 0 | 2 | 1 | ... | -6 |
| R3 | 12 | 7 | -12 | -10 | 21 | 58 | 10 | 16 | 22 | ... | -2 |
| R4 | 49 | 20 | -68 | -26 | 137 | 195 | 55 | 48 | 56 | ... | -46 |
| R5 | 48 | 12 | -69 | -22 | 143 | 197 | 63 | 50 | 50 | ... | -54 |
| R6 | 21 | 11 | -12 | -3 | 27 | 67 | 11 | 13 | 22 | ... | -12 |
| R7 | 3 | 2 | 0 | 2 | 7 | 5 | 1 | 3 | 4 | ... | -2 |
| R8 | 5 | 4 | 0 | 3 | 3 | 2 | -2 | 1 | 0 | ... | -6 |
| R9 | 1 | -2 | 0 | 1 | 1 | 3 | -1 | 4 | -3 | ... | 1 |
| R10 | 5 | 2 | 1 | -1 | 3 | 0 | -3 | 1 | -3 | ... | 4 |
| R11 | 3 | -2 | 0 | 5 | 5 | 1 | 2 | -3 | 0 | ... | -1 |
| R12 | 1 | 0 | -2 | 4 | 1 | 1 | -2 | 4 | 1 | ... | 0 |
| R13 | -5 | -7 | 1 | 0 | 0 | 0 | -1 | -1 | -3 | ... | 6 |
| R14 | 0 | 0 | -4 | -3 | 2 | -3 | -3 | 1 | -9 | ... | 0 |
| ... | ... | ... | ... | ... | ... | ... | ... | ... | ... | ... | 2 |
| Rm | 1 | 5 | -3 | 2 | 2 | -2 | -1 | -1 | 1 | ... | -4 |

| | C1 | C2 | C3 | C4 | C5 | C6 | C7 | C8 | C9 | ... | Cn |
|---|---|---|---|---|---|---|---|---|---|---|---|
| R1 | 0 | 0 | 0 | 0 | 0 | 0 | 0 | 0 | 0 | ... | 0 |
| R2 | 0 | 0 | 0 | 0 | 0 | 0 | 0 | 0 | 0 | ... | 0 |
| R3 | 0 | 0 | 0 | 0 | 0 | 172 | 0 | 0 | 0 | ... | 0 |
| R4 | 0 | 0 | 0 | 0 | 199 | 311 | 146 | 0 | 0 | ... | 0 |
| R5 | 0 | 0 | 0 | 0 | 211 | 292 | 147 | 0 | 0 | ... | 0 |
| R6 | 0 | 0 | 0 | 0 | 0 | 140 | 0 | 0 | 0 | ... | 0 |
| R7 | 0 | 0 | 0 | 0 | 0 | 0 | 0 | 0 | 0 | ... | 0 |
| R8 | 0 | 0 | 0 | 0 | 0 | 0 | 0 | 0 | 0 | ... | 0 |
| R9 | 0 | 0 | 0 | 0 | 0 | 0 | 0 | 0 | 0 | ... | 0 |
| R10 | 0 | 0 | 0 | 0 | 0 | 0 | 0 | 0 | 0 | ... | 0 |
| R11 | 0 | 0 | 0 | 0 | 0 | 0 | 0 | 0 | 0 | ... | 0 |
| R12 | 0 | 0 | 0 | 0 | 0 | 0 | 0 | 0 | 0 | ... | 0 |
| R13 | 0 | 0 | 0 | 0 | 0 | 0 | 0 | 0 | 0 | ... | 0 |
| R14 | 0 | 0 | 0 | 0 | 0 | 0 | 0 | 0 | 0 | ... | 0 |
| ... | ... | ... | ... | ... | ... | ... | ... | ... | ... | ... | ... |
| Rm | 0 | 0 | 0 | 0 | 0 | 0 | 0 | 0 | 0 | ... | 0 |

TABLE 600

FIG. 6

REDUCING COMMON MODE NOISE IN TOUCH APPLICATIONS

RELATED APPLICATIONS

This application is a continuation of U.S. patent application Ser. No. 14/018,360 filed on Sep. 4, 2013, which claims the benefit of U.S. Provisional Application No. 61/835,306 filed on Jun. 14, 2013, and U.S. Provisional Application No. 61/697,046 filed on Sep. 5, 2012. The contents of the above-referenced applications are hereby incorporated by reference herein.

TECHNICAL FIELD

This disclosure relates to the field of touch-sensor devices and, in particular, to reducing common mode noise in touch applications.

BACKGROUND

Computing devices, such as notebook computers, personal data assistants (PDAs), mobile communication devices, portable entertainment devices (such as handheld video game devices, multimedia players, and the like) and set-top-boxes (such as digital cable boxes, digital video disc (DVD) players, and the like) have user interface devices, which are also known as human interface devices (HID), that facilitate interaction between the user and the computing device. One type of user interface device that has become more common is a touch-sensor device that operates by way of capacitance sensing. A touch-sensor device usually is in the form of a touch-sensor pad, a touch-sensor slider, or touch-sensor buttons, and includes an array of one or more capacitive sense elements. The capacitance detected by a capacitance sensor changes as a function of the proximity of a conductive object to the touch sensor. The conductive object can be, for example, a stylus or a user's finger.

One type of capacitance sensing device includes multiple touch sense electrodes arranged in rows and columns and forming an array of intersections. At each intersection of the electrodes in the X and Y axes (i.e., a location where the approximately orthogonal electrodes cross over, but do not connect with, one another), a mutual capacitance is formed between the electrodes thus forming a matrix of capacitive sense elements. This mutual capacitance is measured by a processing system and a change in capacitance (e.g., due to the proximity or movement of a conductive object) can be detected. In a touch-sensor device, a change in capacitance of each sense element in the X and Y axes of the touch sense array can be measured by a variety of methods. Regardless of the method, usually an electrical signal representative of the capacitance of the capacitive sense elements is measured and processed by a processing device, which in turn produces electrical or optical signals representative of the position of one or more conductive objects in relation to the touch-sensor pad in the X and Y axes. A touch-sensor strip, slider, or button may operate on the same or another capacitance-sensing principle.

BRIEF DESCRIPTION OF THE DRAWINGS

The present disclosure is illustrated by way of example, and not by way of limitation, in the figures of the accompanying drawings.

FIG. 4 is a table illustrating sample changes in capacitance values measured on sensor elements of a touch-sensor device, according to one embodiment.

FIG. 5 is a table illustrating sample changes in capacitance values measured on sensor elements of a touch-sensor device, according to another embodiment.

FIG. 6 is a table illustrating sample changes in capacitance values measured on sensor elements of a touch-sensor device, according to a further embodiment.

DETAILED DESCRIPTION

Figure 1:
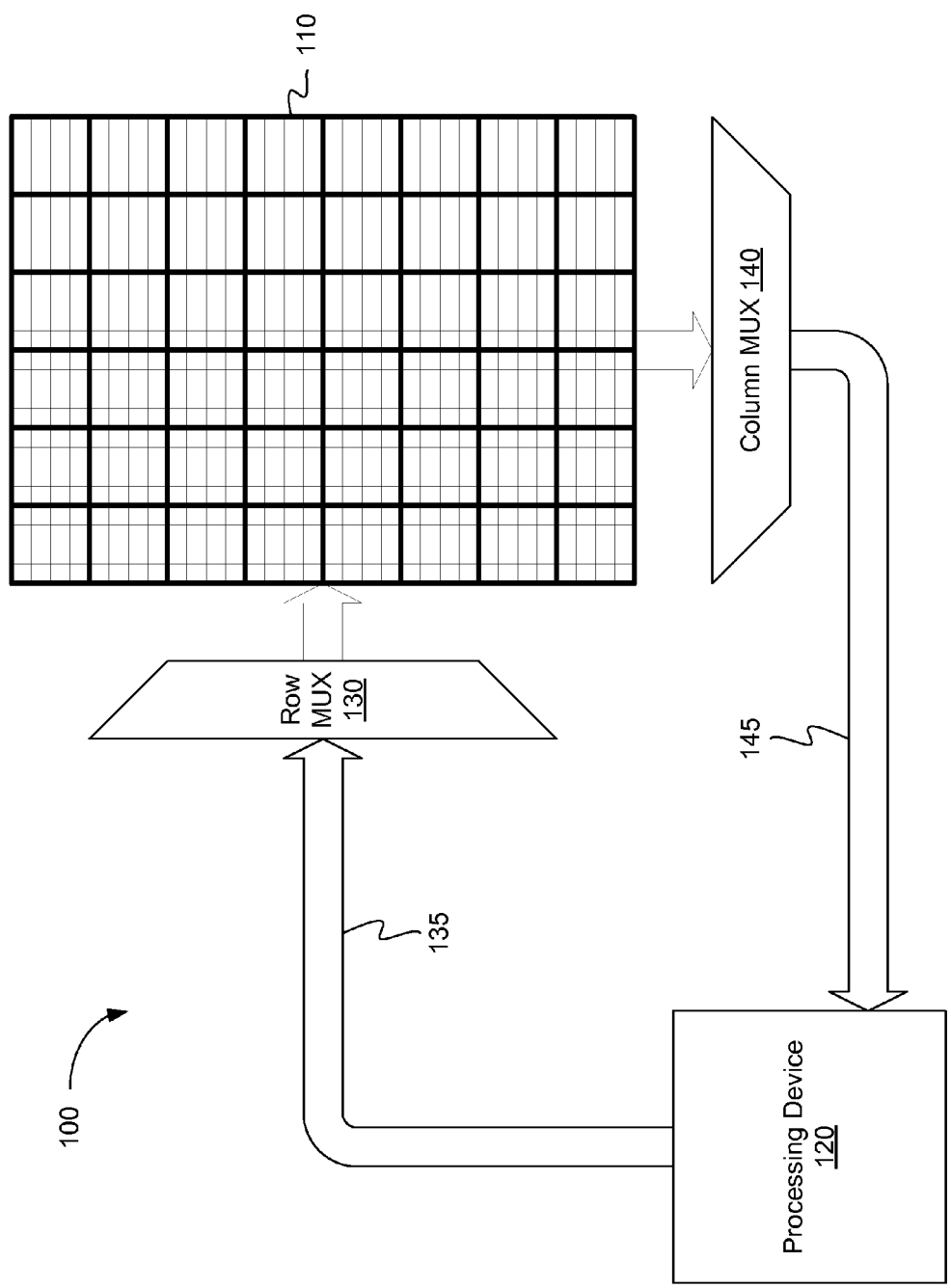
FIG. 1 is a block diagram illustrating a capacitance sensing system, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for reducing common mode noise in touch applications. A touch-sensor device, such as a touch-screen display, a touch-sensor pad, a touch-sensor slider, or touch-sensor buttons can be used to detect the presence of a conductive object that is on or near the touch-sensor device. The touch-sensor device may include an array of one or more capacitive sense elements (e.g., electrodes). The capacitance detected by a capacitance sensor changes as a function of the proximity of a conductive object to the touch sensor. In one embodiment, the touch-sensor device includes multiple touch sense electrodes arranged in rows and columns and forming an array of intersections. At each intersection of the electrodes in the X and Y axes (i.e., a location where the approximately orthogonal electrodes cross over, but do not connect with, one another), a mutual capacitance is formed between the electrodes thus forming a matrix of capacitive sense elements. This mutual capacitance is measured by a processing system and a change in capacitance (e.g., due to the proximity or movement of a conductive object) can be detected.

In one embodiment, the touch-sensor device is located with an electronic computing device such as a mobile phone, laptop computer, tablet, or other device. As a result, other components in the device may cause noise that can affect the performance of the touch-sensor device. Two examples of this noise are charger noise, such as from a charger (or other power source) used to charge a battery in the electronic device, and display noise, such as from a display located near the touch-sensor device in the electronic device. Charger noise is physically coupled into the sensor during the presence of touch through the battery charger. Charger noise is multiplicative noise in that it affects the electrodes of the touch-sensor device proportionally to the change in capacitance measured at each electrode. Thus, the charger noise may be higher on electrodes that are closer to the location of a finger touch and less on electrodes that are further away. Display noise is directly coupled across the entire surface of the sensor by the display (e.g., a liquid crystal display (LCD)). Display noise is additive noise in that it affects all electrodes of the touch-sensor device equally. In some embodiments, the charger noise and display noise may be referred to as common-mode noise. In other embodiments, there may be other sources of noise that affect the touch-sensor device.

As the power used by the charger and display vary over time, so too does the noise that these components produce. Thus, if the electrodes of touch-sensor device are scanned successively over a period of time, the noise may change for each scan thereby affecting the capacitance measurements. This may lead to inaccuracies in the position determination of the touch object. To counteract the effects of common mode noise, in one embodiment, a processing device includes at least as may receive channels as there are electrodes along each axis of the touch-sensor device. Thus, in a first time slot, the processing device may scan the electrodes along (e.g., parallel to or aligned with) a first axis of the device (e.g., the vertical columns) and a subset of the resulting signals may be used to determine a first coordinate of the touch location (e.g., the X axis coordinate). In a second time slot, the processing device may scan the electrodes along (e.g., parallel to or aligned with) a second axis of the device (e.g., the horizontal row) and a subset of the resulting signals may be used to determine a second coordinate of the touch location (e.g., the Y axis coordinate).

To calculate the coordinates for the position of the touch object, the processing device may select a touch position equation, from a plurality of touch position equations. The equations may include, for example, a centroid equation which is not sensitive to multiplicative charger noise, a linear interpolation equation which is not sensitive to multiplicative charger noise or additive display noise, or other equations. Since the common-mode noise is consistent for the measurement signals on each electrode along a single axis of the touch-sensor device, these equations can effectively remove any measurement error attributable to the noise and output an accurate positional coordinate. This can allow for the accurate determination of a touch location even in the presence of common-mode noise.

FIG. 1 is a block diagram illustrating a capacitance sensing system 100, according to an embodiment of the present invention. In one embodiment, capacitance sensing system 100 includes capacitive sense array 110, processing device 120, and multiplexers 130, 140. Capacitive sense array 110 may be part of, for example, a touch-sensing device, such as a touch-sensor pad, a touch-screen display, a touch-sensor slider, a touch-sensor button, or other device. Capacitive sense array 110 may include a matrix of sense elements arranged in rows and columns (e.g., in the X and Y axes) that can be used to detect the proximity or physical contact of a conductive object (e.g., a user's finger). In one embodiment, processing device 120 uses a mutual capacitance sensing technique to measure capacitive sense array 110, where a mutual capacitance is present at the location where each transmit electrode (e.g., row) crosses each receive electrode (e.g., column). The magnitude of change in this mutual capacitance at one or more intersections allows processing device 120 to determine the approximate location of the conductive object.

With mutual capacitance sensing, one set of electrodes (e.g., the rows oriented parallel to the X axis) are designated as transmit (TX) electrodes. The transmit electrodes are driven with an electronic signal 135 provided by processing device 120. In one embodiment, row multiplexer (MUX) 130 may be used to apply the electronic signal 135 to one or more of the transmit electrodes. Another set of electrodes (e.g., the columns oriented parallel to the Y axis) are designated as receive (RX) electrodes. The mutual capacitance between the driven rows and columns may be measured by sampling a signal on each of the receive electrodes. In one embodiment, column multiplexer 140 may be used to couple the signal received on one or more of the receive electrodes and provide the received signal 145 back to processing device 120 for measurement. Row multiplexer 130 and column multiplexer 140, which may be referred to as transmit multiplexer and receive multiplexer respectively, may be used to switch which electrodes are used as transmit electrodes and which are used as receive electrodes during different time slots, as will be described further below.

The designation of rows and columns as transmit and receive electrodes is merely one example, and in other embodiments, the rows and columns may be reversed. In a further embodiment, the allocation of transmit and receive electrodes may be dynamic in nature, such that for one measurement an electrode may be used as a transmit electrode, and in a following measurement occurring at a different time, the same electrode may be used as a receive electrode. For example, in a first time slot, processing device 120 may drive one or more of the rows of capacitive sense array 110 with TX signal 135 and measure the capacitance on the columns to generate RX signal 145. Then, in a subsequent time slot, that occurs at a different time than the first time slot, processing device 120 may drive one or more of the columns of capacitive sense array 110 with a TX signal 145 and measure the capacitance on the rows to generate RX signal 135. Processing device 120 may use RX signal 145 from the first time slot to determine an X axis coordinate of the touch object and use the RX signal 135 from the second time slot to determine a Y axis coordinate of the touch object.

Figure 2:
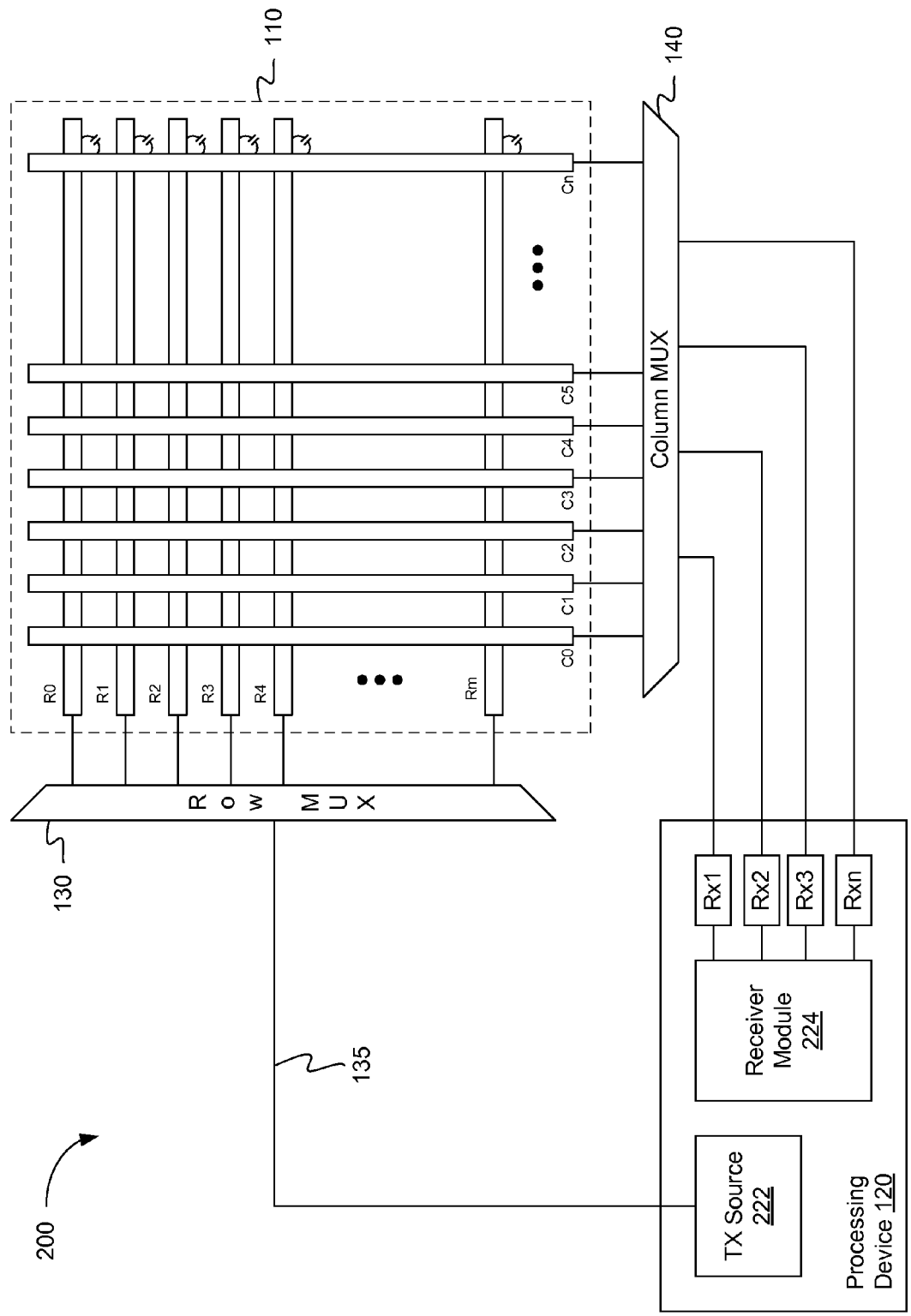
FIG. 2 is a block diagram illustrating a capacitance sensing system, according to an embodiment.

FIG. 2 is a block diagram illustrating a capacitance sensing system 200, according to an embodiment of the present invention. In one embodiment, capacitance sensing system 200 includes capacitive sense array 110, processing device 120, and multiplexers 130, 140, as described above with respect to FIG. 1. In capacitive sense array 110, individual row electrodes R0-Rm and column electrodes C0-Cn are shown. In different embodiments, there may be any number of row and column electrodes in capacitive sense array 110.

Each of row electrodes R0-Rm may be connected to row multiplexer 130, which controls application of signal 135. Row multiplexer 130 may selectively apply signal 135 to one or more of row electrodes R0-Rm based on a control signal (not shown). The control signal may be received from processing device 120 or from some other source. Row multiplexer 130 may apply signal 135 to (i.e., drive) a select number of row electrodes at a time (e.g., R0-R3) or may drive all row electrodes at the same time. The row electrodes may be driven sequentially (i.e., one at a time) with the signal 135, or a select number may be driven at the same time. The number of row electrodes driven at one time may also be based on electrical considerations of capacitive sense array 110 and processing device 120, such as the level of charge that column electrodes C0-Cn can handle, or the maximum charge that the signal 135 may provide. In one embodiment, signal 135 is provided by transmit source component 222 of processing device 120. In other embodiments, however, signal 135 may be provided by some other source. In some embodiments, transmit source component 222 may drive multiple row electrodes with a transmit signal 135 having multiple phases, frequencies or amplitudes.

Each of column electrodes C0-Cn may be connected to column multiplexer 140, which controls the application of receive signals to processing device 120 for measurement and processing. In one embodiment, processing device 120 includes receiver module 224. Receiver module 224 may couple to a number of receive channels Rx1, Rx2, Rx3, Rxn, each of which is configurable to measure and process a receive signal from one or more of column electrodes C0-Cn. In other embodiments, there may some other number of receive channels. For example, there may be one receive channel for each column electrode in capacitive sense array 110, thus allowing each column to be measured at the same time. In certain embodiments, however, the number of receive channels may be less than the number of receive electrodes, thus preventing all receive electrodes from being measured at once. Column multiplexer 140 may selectively apply receive signals from a number of column electrodes (e.g., C0-C3) to one receive channel (e.g., Rx1) for measurement based on a control signal (not shown). The control signal may be received from processing device 120 or from some other source.

In one embodiment, the configuration described above may be used in a first time slot in order to determine an X axis coordinate of a touch object proximate to capacitive sense array 110. Since all columns C0-Cn may be sensed at the same time, the noise attributable to either LCD noise or charge noise, on electrode will be consistent. In a subsequent time slot, the configuration may be altered such that TX source component 222 is connected to column multiplexer 140 and receiver module 224 is connected to row multiplexer 130. Processing device 120 may include switching circuitry to enable the configuration change or there may be additional switching circuitry external to processing device (not shown). In the second configuration, the columns C0-Cn may be driven with a transmit signal and all rows R0-Rm may be sensed at the same time in order to determine a Y axis coordinate of the touch object. Although occurring at a different time slot than the determination of the X axis coordinate, the noise will be consistent within the second time slot, allowing for an accurate determination of the touch object position. In one embodiment, the first time slot and the second time slot may not overlap in time.

In one embodiment, the number of rows R0-Rm or columns C0-Cn in a capacitive sense array 110 may outnumber the number of receive channels Rx0-RxN in a processing device 120. In such a situation, the processing device 120 may not be able to scan all of the rows or all of the columns in a single time slot. Accordingly, in one embodiment, processing device 120 may use scan the electrodes along (e.g., parallel or aligned with) one or both axes of capacitive sense array 110 over multiple time slots and there is an overlap of one or more electrodes scanned over the multiple time slots (e.g., one or more electrodes are scanned in two different time slots). For example, the processing device 120 may include 11 receive channels, which is enough to scan the 11 rows in a single time slot, but not the 20 row. In one embodiment during a first time slot, columns 1-11 are scanned and during a second time slot, columns 10-20 are scanned. Thus, there is an overlap of at least two electrodes (e.g., columns 10 and 11) between the two time slots. In another embodiment, the multiple time slots may not overlap in time.

Figure 3A:
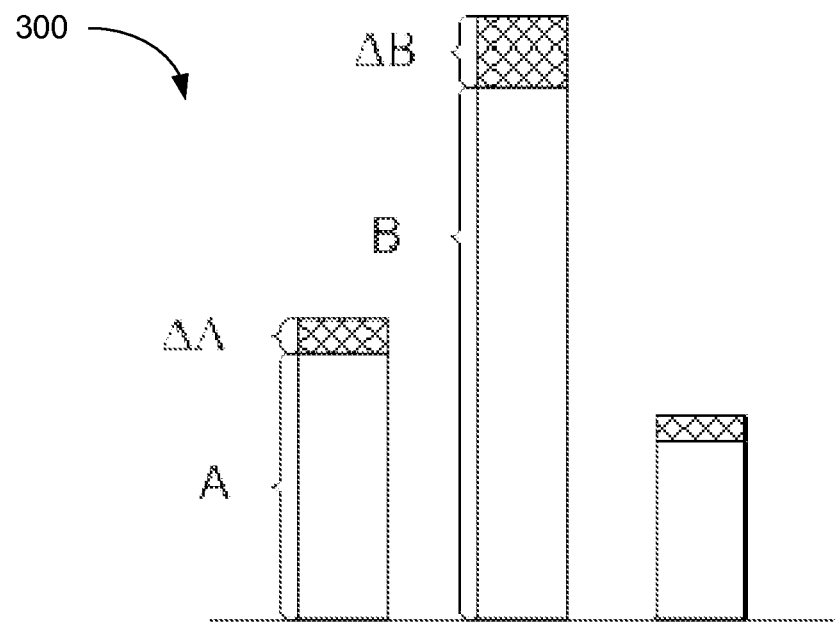
FIG. 3A is a chart illustrating the change in capacitance values measured on sensor elements of a touch-sensor device and the effect of common-mode charger noise, according to an embodiment.

FIG. 3A is a chart illustrating the change in capacitance values measured on sensor elements of a touch-sensor device and the effect of common-mode charger noise, according to an embodiment. Charger noise is noise that is physically coupled into the touch-sensor device during the presence of a touch through the battery charger. It can be seen as degraded accuracy or linearity of the touch, false or phantom touches, or even a touchscreen that becomes unresponsive or erratic. Charger noise can typically be attributed to an aftermarket low cost charger.

In the chart 300 of FIG. 3A, the capacitance values A and B may represent the difference between the count value determined by each sensor (e.g., electrode) and a baseline value when no conductive object is present. The horizontal axis of the chart 300 corresponds to the sensor element number (e.g., row electrodes R0-Rm of the capacitive sense array 110). The height of the columns on the vertical axis represents the measured difference counts for each of the electrodes with the presence of a touch object, such as a finger or other capacitive object. The hashed portion of each column labeled ΔA and ΔB represents the portion of the measured change in capacitance attributable to the charger noise. As illustrated in this embodiment, the charger noise ΔA and ΔB is proportional to the measured change in capacitance A and B on each electrode. Capacitance A and B may be the measured change in capacitance under the finger. For example, a processing device may continuously measure the capacitance values measured between rows and columns of electrodes. When a touch object (e.g., a finger) comes into contact with the sensor elements (or moves proximate to the sensor elements) the touch object may detect the changes in the mutual capacitance for one or more sensor elements (e.g., the mutual capacitance may decrease). Thus, the charger noise ΔA is less than the charger noise ΔB because the measured change in capacitance A is less than the measured change in capacitance B. In this embodiment, the measured change in capacitance B is a peak value (likely due to the presence of a touch object located adjacent to the corresponding electrode) and thus, the highest amount of charger noise ΔB is also observed on this same electrode.

Figure 3B:
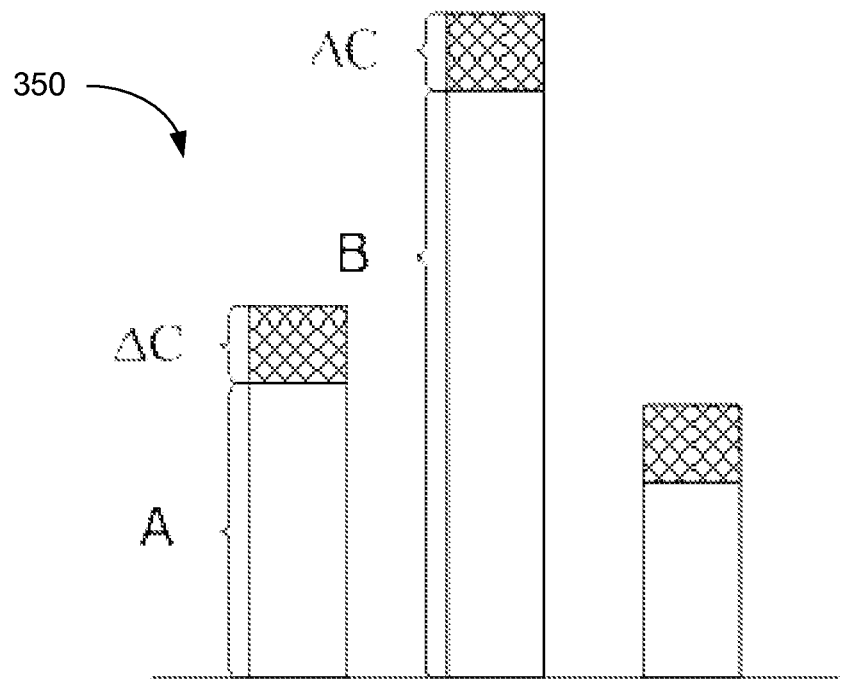
FIG. 3B is a chart illustrating the change in capacitance values measured on sensor elements of a touch-sensor device and the effect of common-mode display noise, according to an embodiment.

FIG. 3B is a chart illustrating the change in capacitance values measured on sensor elements of a touch-sensor device and the effect of common-mode display noise, according to an embodiment. The display in an electronic device, such as an LCD used in a touchscreen can generate quite a bit of noise that can be conducted directly into the capacitive touchscreen sensor. The chart 350 of FIG. 3B includes the same change in capacitance values A and B as well as a display noise portion ΔC. As illustrated in this embodiment, the display noise ΔC is equal across each electrode in the touch-sensor device and is not affected by the amount of measured capacitance A and B on each electrode.

FIG. 4 is a table 400 illustrating sample changes in capacitance values measured on sensor elements of a touch-sensor device, according to one embodiment. The table 400 includes capacitance values that are calculated or obtained from transmitting a TX signal along the horizontal electrodes (e.g., the rows or electrodes parallel to or aligned with the X axis) and receiving an RX signal along the vertical electrodes (e.g., the columns or electrodes parallel to or aligned with the Y axis). Calculating or obtaining capacitance values by sending a TX signal along the horizontal electrodes and measuring the RX signal along the vertical electrodes may be referred to as performing an "X scan." The table 400 may be referred to as an "X scan matrix."

Each row in the table 400 may correspond to a horizontal electrode in the touch-sensor device. For example, the row R1 may correspond to the first (e.g., top) horizontal electrode of the touch sensor device, the row R2 may correspond to the second horizontal electrode of the touch-sensor device, etc. Each column in the table 400 may correspond to a vertical electrode in the touch-sensor device. For example, the column C1 may correspond to the first (e.g., leftmost) vertical electrode of the touch sensor device, the column C2 may correspond to the second vertical electrode of the touch-sensor device, etc. Each entry in the table 400 may indicate a change in capacitance value measured an intersection of electrodes in the touch-sensor device. For example, the entry at the intersection of C1 and R1 in the table 400 (that has a value of "2") may indicate a change in capacitance value measured at the intersection of the top horizontal electrode and the leftmost vertical electrode, the entry at the intersection of C2 and R1 (that has a value of "3") may indicate a change in capacitance value measured at the intersection of the top horizontal electrode and the next vertical electrode that is left of the leftmost vertical electrode, etc. In one embodiment, the changes in capacitance may be obtained by comparing the capacitance values measured a first point in time (e.g., baseline capacitance values) with the capacitance values measured during the X scan.

The table 400 also includes a subset 405 of the change in capacitance values in the table 400. In one embodiment, the subset 405 may be used by the processing device to determine the local maximum change in capacitance values caused by the touch object. The subset 405 may also be used to determine the X-coordinate of a touch object that is proximate to the touch-sensor device. The subset 405 and determining the X-coordinate of the touch object are discussed below in conjunction with FIG. 6.

FIG. 5 is a table 500 illustrating sample changes in capacitance values measured on sensor elements of a touch-sensor device, according to another embodiment. The table 500 includes changes in capacitance values that are calculated or obtained from transmitting a TX signal along the vertical electrodes (e.g., the columns or electrodes parallel to the Y axis) and receiving an RX signal along the horizontal electrodes (e.g., the rows or electrodes parallel to the X axis). Calculating or obtaining capacitance values by sending a TX signal along the vertical electrodes and measuring the RX signal along the horizontal electrodes may be referred to as performing a "Y scan." The table 500 may be referred to as a "Y scan matrix."

Each row in the table 500 may correspond to a horizontal electrode in the touch-sensor device. For example, the row R1 may correspond to the first (e.g., top) horizontal electrode of the touch sensor device, the row R2 may correspond to the second horizontal electrode of the touch-sensor device, etc. Each column in the table 500 may correspond to a vertical electrode in the touch-sensor device. For example, the column C1 may correspond to the first (e.g., leftmost) vertical electrode of the touch sensor device, the column C2 may correspond to the second vertical electrode of the touch-sensor device, etc. Each entry in the table 500 may indicate a change in capacitance value measured an intersection of electrodes in the touch-sensor device. For example, the entry located at the intersection of C1 and R1 in the table 500 (that has a value of "5") may indicate a change in capacitance value measured at the intersection of the top horizontal electrode and the leftmost vertical electrode, the entry located at the intersection of R2 and C1 (that has a value of "8") may indicate a change in capacitance value measured at the intersection of the horizontal electrode below the top horizontal electrode and the leftmost vertical electrode, etc.

The table 500 also includes a subset 505 of the change in capacitance values in the table 500. In one embodiment, the subset 505 may be used by the processing device to determine the local maximum change in capacitance values caused by the touch object. The subset 505 may also be used to determine the Y-coordinate of a touch object that is proximate to the touch-sensor device. The subset 505 and determining the Y-coordinate of the touch object are discussed below in conjunction with FIG. 6.

FIG. 6 is a table 600 illustrating sample changes in capacitance values measured on sensor elements of a touch-sensor device, according to a further embodiment. The table 600 includes capacitance values that are calculated or obtained by adding some of the capacitance values obtained from an X scan (e.g., capacitance values obtained by transmitting a TX signal on horizontal electrodes an receiving an RX signal on vertical electrodes, as illustrated in FIG. 4) and some of the capacitance values obtained from a Y scan (e.g., capacitance values obtained by sending a TX signal on vertical electrodes an receiving an RX signal on horizontal electrodes, as illustrated in FIG. 5). The table 600 may also be referred to as a RESULT matrix.

In one embodiment, each entry in the table 600 (e.g., the RESULT matrix) may be generated using the following equation:

$$RESULT_{i,j} = SX_{i,j} + SY_{i,j} \quad (1)$$

where "SX" is an X scan matrix (as illustrated in FIG. 4) and "SY" is a Y scan matrix (as illustrated in FIG. 5). For example, the entry located at the intersection of C1 and R1 in table 600 may be calculated by adding the entry (e.g., capacitance value) located at the intersection of C1 and R1 in table 400 to the entry (e.g., capacitance value) located at the intersection of C1 and R1 in table 500. In another example, the entry located at the intersection of C8 and R7 in table 600 may be calculated by adding the entry located at the intersection of C8 and R7 in table 400 to the entry located at the intersection C8 and R7 in table 500. The values below a threshold value (e.g., 50, 75, etc.) are set to 0 in the RESULT matrix (e.g., table 600) in FIG. 6.

In another embodiment, each entry in the table 600 (e.g., the RESULT matrix) may be generated using the following equation:

$$RESULT_{i,j} = \begin{cases} SX_{i,j} + SY_{i,j}, & (SX_{i,j} > \text{Threshold}) \,\&\&\, (SY_{i,j} > \text{Threshold}); \\ 0, & \text{otherwise.} \end{cases} \quad (2)$$

where "SX" is a X scan matrix (as illustrated in FIG. 4) and "SY" is a Y scan matrix (as illustrated in FIG. 5), and where "Threshold" is a minimum or threshold value that is used to determine whether a capacitance value from the X scan matrix should be added to a capacitance value from the Y scan matrix. For example, if Threshold is the value "50", the entry located at the intersection of C1 and R1 in table 600 is "0" because the entry located at the intersection of C1 and R1 in the table 400 is not greater than 50 and the entry located at the intersection of C1 and R1 in the table 500 is also not greater than 50. In another example, the entry located at the intersection of C7 and R3 in table 600 is "0" because the entry located at the intersection of C7 and R3 in the table 500 is not greater than 50 even though the entry located at the intersection C7 and R3 in the table 400 is greater than 50. In a further example, the entry located at the intersection of C7 and R4 is 146 because the entry located at the intersection of C7 and R4 in the table 400 is greater than 50 and the entry located at the intersection of C7 and R4 in the table 500 is greater than 50. The entry located at the intersection of C7 and R4 (e.g., 91) in the table 400 is added to the entry located at the intersection of C7 and R4 (e.g., 55) to generate the value 146. Each entry in the table 600 (e.g., the RESULT matrix) may be greater than 2*Threshold because each of the entries from the table 400 and the table 500 that was added to obtain (e.g., calculate or generate) the entry in the table 600 was greater than Threshold.

In one embodiment, a subset 605 of the entries (e.g., the capacitance values) may be identified after the table 600 is generated. The subset 605 may be identified by identifying entries that are bound by the rows and columns with values greater than zero. For example, row R3, R4, R5, and R6 include values greater than 0 and columns C5, C6, and C7 include values greater than zero. Thus, the subset 605 includes entries (e.g., capacitance values) bounded by rows R3 and R6 and columns C5 and C7.

Referring to FIGS. 4 and 5, in one embodiment, the subset 605 is used to identify subsets 405 and 505 in the tables 400 and 500 respectively. The rows and columns that are the boundaries of the subset 605 are used to identify the subsets 405 and 505 in the tables 400 and 500 respectively. For example, the subset 605 includes entries bound by rows R3 and R6 and columns C5 and C7. The rows R3 and the columns C5 and C7 may be used to identify the subsets 405 and 505. The subset 405 may include the entries of table 400 that are bound by rows R3 and R6 and columns C5 and C7 and the subset 505 may include entries of table 500 that are also bound by rows R3 and R6 and columns C5 and C7.

Referring to FIG. 4, in one embodiment, a processing device (e.g., processing device illustrated in FIGS. 1, 2, and 9) may add the capacitance values each column of the subset 405 using the following equation:

$$\text{Sum}_{col}(j) = \sum_{i=min\_row}^{max\_row} |X\_scan_{i,j}| \qquad (3)$$

where "j" ranges from the leftmost column of the subset 405 (e.g., column C5) to the right most column of the subset 405 (e.g., column C7), where "i" ranges from the top row of the subset 405 (e.g., row R3) to the bottom row of the subset 405 (e.g., row R6), and where X_scan is an X scan matrix (e.g., table 400). For example, referring back to FIG. 4, the entries in column C5 starting from R3 to R6 (e.g., the capacitance values 44, 62, 68, and 27) may be added together to obtain the value 207. The entries in column C6 starting from R3 to R6 (e.g., the capacitance values 114, 116, 95, and 73) may be added together to obtain the value 398. The entries in column C7 starting from R3 to R6 (e.g., the capacitance values 67, 91, 84, and 37) may be added together to obtain the value 279.

After obtain a combined value for each column in the subset 405, the processing device may identify the column in the subset 405 that has the highest value using the following equation:

$$\text{LocalMaximum} X = \max(\text{Sum}_{col}(j)) \qquad (4)$$

where "j" ranges from the leftmost column of the subset 405 (e.g., column C5) to the right most column of the subset 405 (e.g., column C7). For example, as discussed above, the entries in column C5 have a combined value of 207, the entries in column C6 have a combined value of 398, and the entries in the column C7 have a combined value of 279. The column that has the highest combined value is column C6. The processing device may determine that the X-coordinate of the electrode associated with column C6 (e.g., the position along an X-axis of the touch-screen device) is a first coordinate of a touch object that is proximate to the touch-screen device.

Referring to FIG. 5, in another embodiment, the processing device (e.g., processing device illustrated in FIGS. 1, 2, and 9) may add the capacitance values each row of the subset 505 using the following equation:

$$\text{Sum}_{row}(i) = \pi_{i=min\_column}^{max\_column} |Y\text{Scan}_{i,j}| \qquad (5)$$

where "j" ranges from the leftmost column of the subset 505 (e.g., column C5) to the right most column of the subset 505 (e.g., column C7), where "i" ranges from the top row of the subset 505 (e.g., row R3) to the bottom row of the subset 505 (e.g., row R6), and where Y_scan is an Y scan matrix (e.g., table 500). For example, referring back to FIG. 5, the entries in R3 starting from C5 to C7 (e.g., the capacitance values 21, 58, and 10) may be added together to obtain the value 89. The entries in R4 starting from C5 to C7 (e.g., the capacitance values 137, 195, and 55) may be added together to obtain the value 387. The entries in R5 starting from C5 to C7 (e.g., the capacitance values 143, 197, and 63) may be added together to obtain the value 403. The entries in R6 starting from C5 to C7 (e.g., the capacitance values 27, 67, and 11) may be added together to obtain the value 105.

After obtain a combined value for each row in the subset 505, the processing device may identify the row in the subset 505 that has the highest value using the following equation:

$$\text{LocalMaximum} Y = \text{Index of max}(\text{Sum}_{row}(i)) \qquad (6)$$

where "i" ranges from the top row of the subset 505 (e.g., row R3) to the bottom row of the subset 505 (e.g., row R6). For example, as discussed above, the entries in row R3 have a combined value of 89, the entries in row R4 have a combined value of 387, the entries in row R5 have a combined value of 403, and the entries in the row R6 have a combined value of 105. The row that has the highest combined value is row R5. The processing device may determine that the Y-coordinate of the electrode associated with row R5 (e.g., the position along a Y-axis of the touch-screen device) is a second coordinate of a touch object that is proximate to the touch-screen device.

The processing device may use the X-coordinate and Y-coordinate determined based on equations 3 through 6 (as discussed above) may to determine the position where the touch object is proximate to or is on contact with the touch-screen device.

Figure 7B:
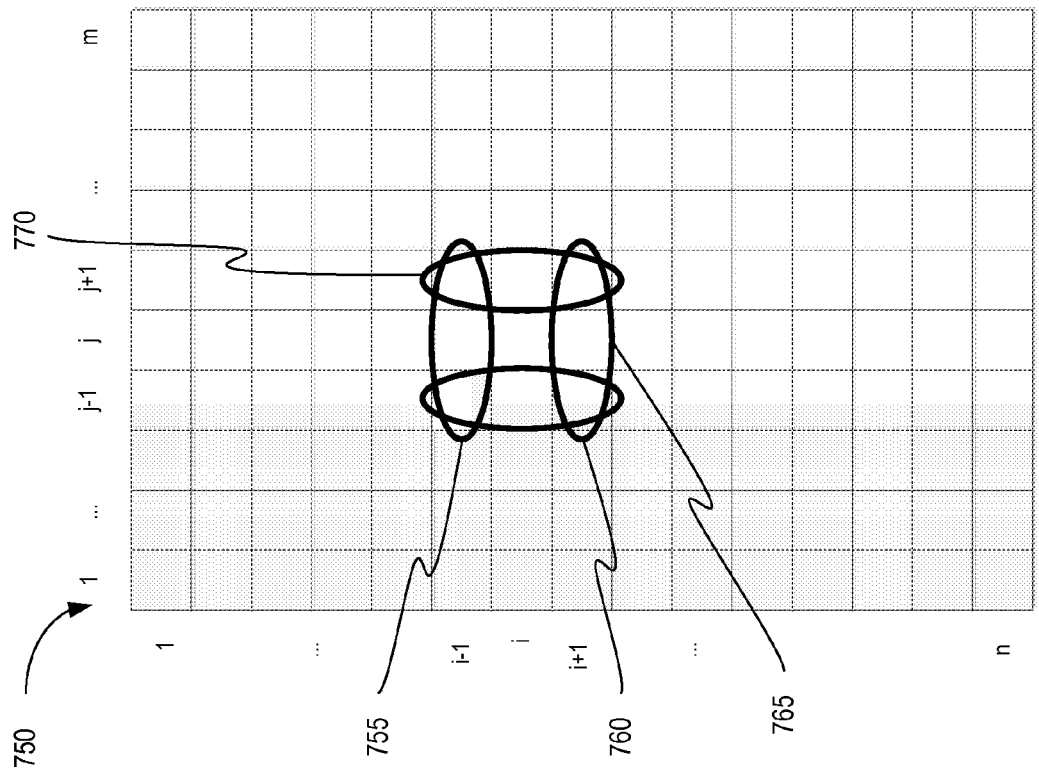
FIG. 7B is a diagram illustrating a capacitive sense array, according to another embodiment.
Figure 7A:
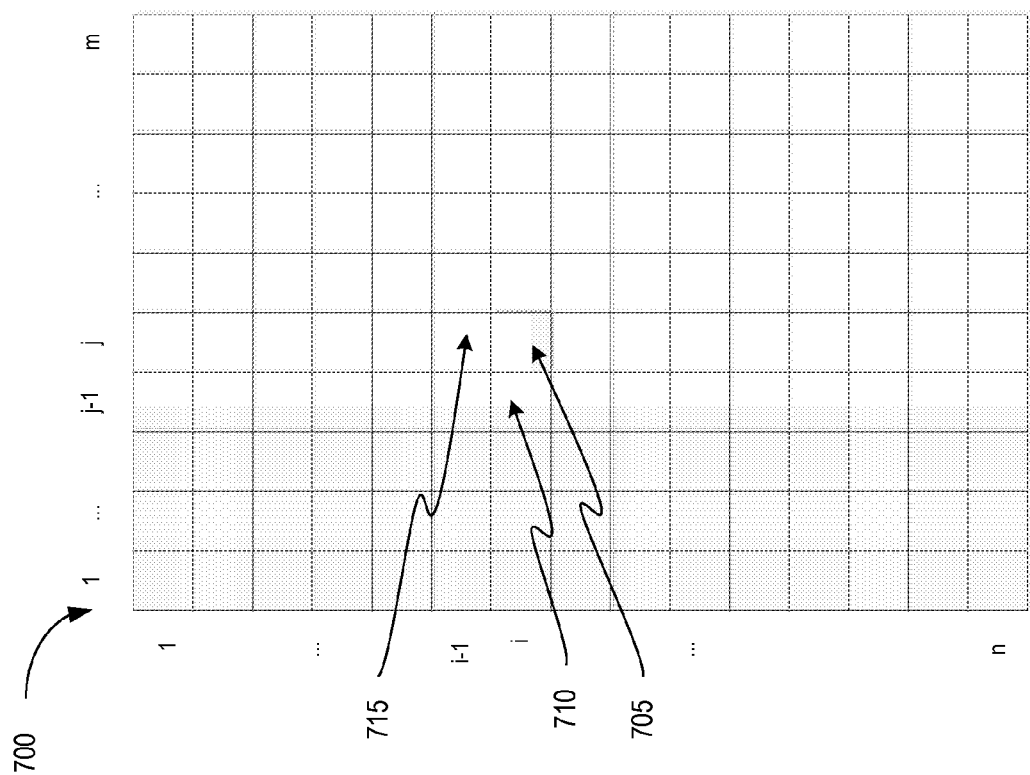
FIG. 7A is a diagram illustrating a capacitive sense array, according to one embodiment.

FIG. 7A is a diagram illustrating a capacitive sense array 700, according to one embodiment. The capacitive sense array includes "m" vertical electrodes and "n" horizontal electrodes. The intersections of the vertical electrodes and the horizontal electrodes are represented as boxes in FIG. 7A. Referring back to FIGS. 4-6, each intersection (e.g., each box) may be associated with a value from an X scan matrix, a Y scan matrix, and a RESULT matrix (generated by adding values from the X scan matrix with values from the Y scan matrix). As discussed above in conjunction with FIG. 6, different equations (e.g., equations 1 and 2) may be used to generate the RESULT matrix. Also as discussed above, the RESULT matrix may be a table or a set of changes in capacitance values obtained by adding one or more changes in capacitance values obtained (e.g., calculated or generated) during an X scan and one or more changes in capacitance values obtained (e.g., calculated or generated) during a Y scan. In one embodiment, the entries or values in RESULT matrix may be obtained (e.g., calculated or generated) using the following equation:

$$RESULT_{i,j} = \begin{cases} SX_{i,j} + SY_{i,j}, A\|B\|C \Big|_{\substack{A=(SX_{i,j}>Threshold)\&\& \\ (SY_{i,j}>Threshold) \\ B=(i>1)\&\&((RESULT_{i-1,j}>0)\&\& \\ ((SX_{i,j}>Threshold)\|(SY_{i,j}>Threshold))) \\ C=(j>1)\&\&((RESULT_{i,j-1}>0)\&\& \\ ((SX_{i,j}>Threshold)\|(SY_{i,j}>Threshold)))}} & ; \quad (7) \\ 0, \text{otherwise.} \end{cases}$$

where "SX" is an X scan matrix (e.g., table 400 illustrated in FIG. 4), where "SY" is a Y scan matrix (e.g., table 500 illustrated in FIG. 5), where "i" is the row for the current entry, where "j" is the column of the current entry, and where "Threshold" is a minimum or threshold value. Referring back to FIGS. 4-6, a current entry $RESULT_{i,j}$ may be the entry located at the intersection of R1 and C1 in table 600. The current entry may be set to the sum of $SX_{i,j}$ (e.g., the entry located at the intersection of R1 and C1 in table 400) and $SY_{i,j}$ (e.g., the entry located at the intersection of R1 and C1 in table 500) if any of the conditions (e.g., criteria) A, B, or C are satisfied or met. If none of the conditions A, B, or C are met or satisfied, the entry $RESULT_{i,j}$ (e.g., the intersection of R1 and C1 in table 600) is set to the value 0. As illustrated in FIG. 7A, equation 7 uses one or more of the values located at $RESULT_{i-1,j}$ and $RESULT_{i,j-1}$ when determining whether to set $RESULT_{i,j}$ to the sum of $SX_{i,j}$ and $SY_{i,j}$ or whether to set $RESULT_{i,j}$ to 0. For example, the values for the entries associated with intersection 710 and 715 in the RESULT matrix may be analyzed (as illustrated in conditions B and C of equation 7) when determining the value for the entry associated with intersection 705 in the RESULT matrix.

FIG. 7B is a diagram illustrating a capacitive sense array 750, according to one embodiment. The capacitive sense array includes "m" vertical electrodes and "n" horizontal electrodes. The intersections of the vertical electrodes and the horizontal electrodes are represented as boxes in FIG. 7B. Referring back to FIGS. 4-6, each intersection (e.g., each box) may be associated with a value from an X scan matrix, a Y scan matrix, and a RESULT matrix (generated by adding values from the X scan matrix with values from the Y scan matrix). As discussed above in conjunction with FIGS. 6 and 7A, different equations (e.g., equations 1, 2, and 7) may be used to generate the RESULT matrix. Also as discussed above, the RESULT matrix may be a table or a set of changes in capacitance values obtained by adding one or more changes in capacitive values obtained (e.g., calculated or generated) during an X scan and one or more changes in capacitance values obtained (e.g., calculated or generated) during a Y scan. In one embodiment, the entries or values in RESULT matrix may be obtained (e.g., calculated or generated) using the following equation:

$$RESULT_{i,j} = \begin{cases} SX_{i,j} + SY_{i,j}, A\|B\|C \Big|_{\substack{A=(SX_{i,j}>Threshold)\&\& \\ (SY_{i,j}>Threshold) \\ B=(counterX_{i,j}>1)\&\& \\ ((SX_{i,j}>Threshold)\|(SY_{i,j}>Threshold))) \\ C=(counterY_{i,j}>1)\&\& \\ ((SX_{i,j}>Threshold)\|(SY_{i,j}>Threshold)))}} & ; \quad (8) \\ 0, \text{otherwise.} \end{cases}$$

where "SX" is an X scan matrix (e.g., table 400 illustrated in FIG. 4), where "SY" is a Y scan matrix (e.g., table 500 illustrated in FIG. 5), where "i" is the row for the current entry, where "j" is the column of the current entry, and where "Threshold" is a minimum or threshold value.

Referring back to FIGS. 4-6, the current entry $RESULT_{i,j}$ may be the entry located at the intersection of R1 and C1 in table 600. The current entry may be set to the sum of $SX_{i,j}$ (e.g., the entry located at the intersection of R1 and C1 in table 400) and $SY_{i,j}$ (e.g., the entry located at the intersection of R1 and C1 in table 500) if any of the conditions (e.g., criteria) A, B, or C are satisfied or met. If none of the conditions A, B, or C are met or satisfied, the entry located at the intersection of R1 and C1 in table 600 is set to the value 0. Conditions B and C are evaluated based on the following equations:

$$counterX_{i,j} = A + B + C + D$$

$$A = \begin{cases} 1, (i>1)\&\&(1<j<m)\&\&(SX_{i-1,j-1}\&\& \\ SX_{i-1,j}\&\&SX_{i-1,j+1}>Threshold) \\ 0, otherwise \end{cases} \quad (9)$$

$$B = \begin{cases} 1, (i<1)\&\&(1<j<m)\&\&(SX_{i+1,j-1}\&\&SX_{i+1,j}\&\& \\ SX_{i+1,j+1}>Threshold) \\ 0, otherwise \end{cases}$$

$$C = \begin{cases} 1, (1<i<n)\&\&(j>1)\&\&(SX_{i-1,j-1}\&\&SX_{i,j-1}\&\& \\ SX_{i+1,j-1}>Threshold) \\ 0, otherwise \end{cases}$$

$$D = \begin{cases} 1, (1<i<n)\&\&(j<m)\&\&(SX_{i-1,j+1}\&\&SX_{i,j+1}\&\& \\ SX_{i+1,j+1}>Threshold) \\ 0, otherwise \end{cases}$$

$$counterY_{i,j} = A + B + C + D \quad (10)$$

$$A = \begin{cases} 1, (i>1)\&\&(1<j<m)\&\&(SY_{i-1,j-1}\&\&SY_{i-1,j}\&\& \\ SY_{i-1,j+1}>Threshold) \\ 0, otherwise \end{cases}$$

$$B = \begin{cases} 1, (i<1)\&\&(1<j<m)\&\&(SY_{i+1,j-1}\&\&SY_{i+1,j}\&\& \\ SY_{i+1,j+1}>Threshold) \\ 0, otherwise \end{cases}$$

$$C = \begin{cases} 1, (1<i<n)\&\&(j>1)\&\&(SY_{i-1,j-1}\&\&SY_{i,j-1}\&\& \\ SY_{i+1,j-1}>Threshold) \\ 0, otherwise \end{cases}$$

$$D = \begin{cases} 1, (1<i<n)\&\&(j<m)\&\&(SY_{i-1,j+1}\&\&SY_{i,j+1}\&\& \\ SY_{i+1,j+1}>Threshold) \\ 0, otherwise \end{cases}$$

As illustrated in FIG. 7B, equation 8 may add also the value $SX_{i,j}$ and $SY_{i,j}$ if two or more of the groups of values located at around the $SX_{i,j}$ or $SY_{i,j}$ are greater than a threshold value. For example, if all the values in SX that correspond to the intersections in group 755 are all greater than the Threshold and if all the values in SX that correspond to the intersections in group 760 are all greater than the Threshold, or if all the values in SX that correspond to the intersections in group 765 are all greater than the Threshold and if all the values in SX that correspond to the intersections in group 770 are all greater than the Threshold, then $RESULT_{i,j}$ may be set to the sum of $SX_{i,j}$ or $SY_{i,j}$ according to equations 8-10. Otherwise, $RESULT_{i,j}$ may be set to the value 0.

Figure 8:
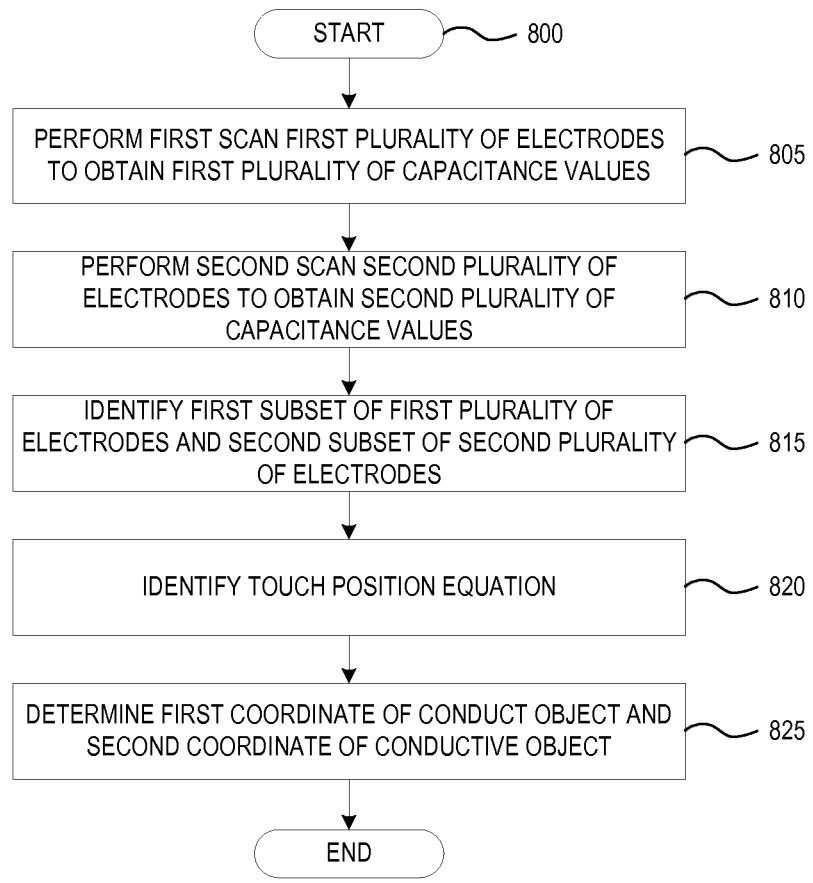
FIG. 8 is a flow chart of another embodiment of a method of determining coordinates of a touch object.

FIG. 8 is a flow chart of another embodiment of a method 800 of determining coordinates of a touch object. The method 800 may be performed by processing logic that may comprise hardware (circuitry, dedicated logic, gates, programmable logic, etc.), software (such as is run on a general purpose computing system or a dedicated machine), firmware (embedded software), or any combination thereof. In one embodiment, the processing device illustrated in FIGS. 1, 2, and 9 may perform the method 800. For simplicity of explanation, the method 800 is depicted and described as a series of acts. However, acts in accordance with this disclosure can occur in various orders and/or concurrently and with other acts not presented and described herein. In addition, some of the acts may be optional. Furthermore, not all illustrated acts may be required to implement the method 800 in accordance with the disclosed subject matter. In addition, those skilled in the art will understand and appreciate that the method 800 could alternatively be represented as a series of interrelated states via a state diagram or events.

The method 800 starts at block 805 where the processing logic performs a first scan of a first plurality of electrodes along a first axis of a capacitive sense array to obtain a first plurality of capacitance values corresponding to changes in mutual capacitance at electrode intersections of the capacitive sense array. For example, referring to FIG. 1, the processing logic may send a TX signal on vertical electrodes of the capacitive sense array and receive an RX signal on the horizontal electrodes of the capacitive sense array. The processing logic may determine capacitance values based on the RX signal. For example, the processing logic may determine capacitance values by determining differences between capacitance values obtained during a previous time period (e.g., during a baseline scan) and capacitance values determined based on the RX signal. At block 810, the processing logic performs a second scan of a second plurality of electrodes along a second axis of the capacitive sense array to obtain a second plurality of capacitance values corresponding to changes in mutual capacitance at electrode intersections of the capacitive sense array. For example, referring to FIG. 1, the processing logic may send a TX signal on horizontal electrodes of the capacitive sense array and receive an RX signal on the vertical electrodes of the capacitive sense array. The processing logic may determine capacitance values based on the RX signal.

The processing logic identifies a first subset of the first plurality of capacitance values and a second subset of the second plurality of capacitance values based on the first scan and the second scan of the electrodes (block 815). For example, the processing logic may identify the first subset and the second subset as discussed above in conjunction with FIGS. 4-6. In one embodiment, the processing logic may use any of equations 1, 2, and 7-10 to generate a RESULT matrix (as discussed above in conjunction with FIGS. 4-6). The processing logic may identify a subset of the RESULT matrix and may use the subset of the RESULT matrix to identify subsets of an X scan matrix and a Y scan matrix (as discussed above in conjunction with FIGS. 4-6).

At block 820, the processing logic may optionally identify a touch position equation. To calculate the coordinates for the position of the touch object, the processing logic may select a touch position equation, from a plurality of touch position equations. The equations may include, for example, a centroid equation which is not sensitive to multiplicative charger noise, a linear interpolation equation which is not sensitive to multiplicative charger noise or additive display noise, or other equations. Since the common-mode noise is consistent for the measurement signals on each electrode along a single axis of the touch-sensor device, these equations can effectively remove any measurement error attributable to the noise and output an accurate positional coordinate. Many displays currently used in electronic device have relatively low noise (e.g. AMOLED displays). In these cases, the processing logic can use an algorithm, such as the centroid equation, that suppress only charger noise and gives good performance (e.g. accuracy, linearity) for a specific display in a low noise environment. For other displays with higher noise, the processing logic can use the linear interpolation equation (even though charger noise may not be a concern. If the display noise is low in a certain device, the processing device perform scanning without Tx-Rx swapping and use a best fit math solution to determine which equation with provide the best performance without noise. If charger noise appears, processing logic can switch and apply the centroid equation (if it gives better performance or better satisfy customer requirements) or the linear interpolation equation. This definition could be done during design tuning (i.e., before production).

In one embodiment, the centroid equation is as follows:

$$X = \text{Pitch} \cdot \left[ i + \frac{1}{2} + \frac{S_{i+1} - S_{i-1}}{S_{i-1} + S_i + S_{i+1}} \right] \quad (11)$$

In the centroid equation, S may represent the signal response (or the measured change in capacitance) on a particular electrode. i may represent the electrode where the conductive object, such as a finger, is located, with i+1 representing the electrode to the right of i and i−1 representing the electrode to the left. Pitch is a value based on the size of the capacitive sense array and the output value X represents the X axis coordinate of the location of the finger touch. In one embodiment, the output value X is not effected by multiplicative error, such as common-mode noise from a charger. The centroid equation, however, may be susceptible to additive error, such as common-mode display noise. The same equation may be used for the results of the scanning during the second time slot to determine the Y axis coordinate of the location of the finger touch.

In one embodiment, the linear interpolation equation is as follows:

$$X = \text{Pitch} \cdot \left[ i + \frac{1}{2} + \frac{S_{i+1} - S_{i-1}}{2 \cdot (S_i - \min(S_{i+1}, S_{i-1}))} \right] \quad (12)$$

In the linear interpolation equation, the output value X is not effected by either multiplicative error, such as common-mode charger noise or additive error, such as common-mode display noise.

At block 825, the processing logic determines a first coordinate of the conductive object (e.g., an X-coordinate) and a second coordinate of the conductive object (e.g., a Y coordinate) based on the first subset of capacitance values and the second subset of capacitance values. For example, the processing logic may use one of equations 11 or 12 to determine the coordinates of the touch object. In another example, the processing logic may use one or more of equations 3-6 to determine the coordinates of the conductive object. After block 825, the method 800 ends. In one embodiment, the processing logic may also use a touch position equation to determine the first coordinate and the second coordinate.

Figure 9:
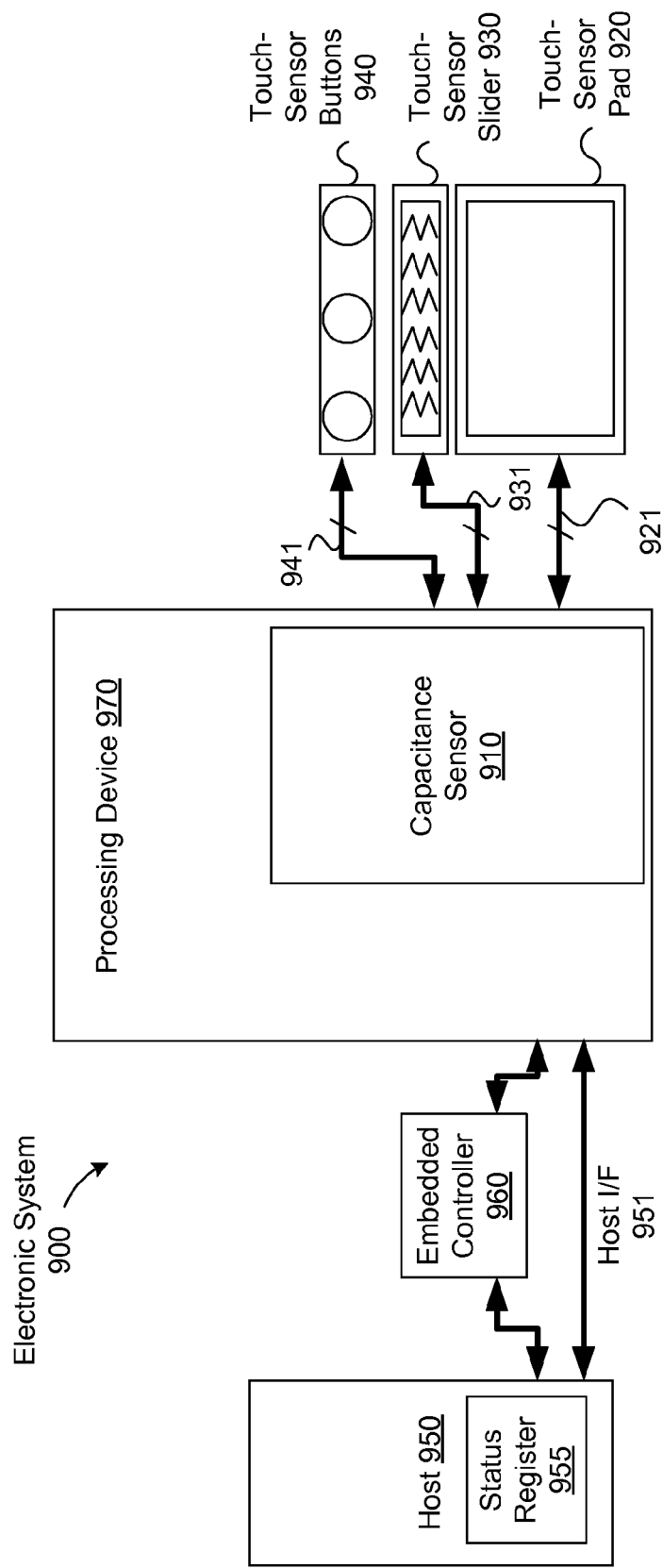
FIG. 9 is a block diagram illustrating an electronic system having a processing device for detecting a presence of a conductive object, according to an embodiment.

FIG. 9 illustrates a block diagram of one embodiment of an electronic system having a processing device for detecting a presence and determining a location of a conductive object.

Electronic system 900 includes processing device 970, touch-sensor pad 920, touch-sensor slider 930, touch-sensor buttons 940, host processor 950, and embedded controller 960. As illustrated, capacitance sensor 910 may be integrated into processing device 970. Capacitance sensor 910 may include analog I/O for coupling to an external component, such as touch-sensor pad 920, touch-sensor slider 930, touch-sensor buttons 940, and/or other devices. In one embodiment, processing device 970 may be representative of processing device 120 discussed above and may also include multiplexers 130, 140.

In one embodiment, the electronic system 900 includes touch-sensor pad 920 coupled to the processing device 970 via bus 921. Touch-sensor pad 920 may include one or more electrodes arranged to form a capacitive sense array such as capacitive sense array 110. For the touch-sensor pad 920, the one or more electrodes may be coupled together to detect a presence of a conductive object on or near the surface of the sensing device. In one embodiment, processing device 970 couples signals into and accepts signals from touch-sensor pad 920 representing capacitance sensed by the capacitive sense array via bus 921. In an alternative embodiment, the electronic system 900 includes a touch-sensor slider 930 coupled to the processing device 970 via bus 931. In another embodiment, the electronic system 900 includes a touch-sensor buttons 940 coupled to the processing device 970 via bus 941.

The electronic system 900 may include any combination of one or more of the touch-sensor pad, a touch-sensor screen, a touch-sensor slider, and touch-sensor buttons. In one embodiment, buses 921, 931 and 941 may be a single bus. Alternatively, the bus may be configured into any combination of one or more separate signals or buses.

In one exemplary embodiment, processing device 970 may be a Programmable System on a Chip (PSoC®) processing device, developed by Cypress Semiconductor Corporation, San Jose, Calif. Alternatively, processing device 970 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Processing device 970 may communicate with an external component, such as a host processor 950, via host interface (I/F) line 951. In one embodiment, host processor 950 includes status register 955. In one example, if processing device 970 determines that a conductive object is present on touch-sensor pad 920, processing device 970 sends instructions to update status register 955 to indicate the presence and location of the conductive object. In an alternative embodiment, processing device 970 sends an interrupt request to host processor 950 via interface line 951.

It should also be noted that the embodiments described herein are not limited to having a configuration of a processing device coupled to a host, but may include a system that measures the equivalent capacitance on the sensing device and sends the raw data to a host computer where it is analyzed by an application. In effect the processing that is done by processing device 970 may also be done in the host. In another embodiment, the processing device 970 is the host.

It should be noted that the components of electronic system 900 may include all the components described above. Alternatively, electronic system 900 may include only some of the components described above, or include additional components not listed herein. It should also be noted that any one of various known methods for measuring capacitance may be used, for example relaxation oscillator methods, current versus voltage phase shift measurement, resistor-capacitor charge timing, capacitive bridge divider, charge transfer, successive approximation, sigma-delta modulation, charge-accumulation circuits, field effect, mutual capacitance, frequency shift, or the like.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices. In an alternative embodiment, for example, the digital processing device may be a network processor having multiple processors including a core unit and multiple microengines. Additionally, the digital processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. The terms "first," "second," "third," "fourth," etc. as used herein are meant as labels to distinguish among different elements and may not necessarily have an ordinal meaning according to their numerical designation.

What is claimed is:

1. A method comprising:
performing a first scan of a first plurality of electrodes along a first axis in a capacitive sense array to obtain a first plurality of capacitance values corresponding to a mutual capacitance at electrode intersections of the capacitive sense array;
after performing the first scan, switching one or more of the first plurality of electrodes from receive electrodes of the first scan to transmit electrodes of a second scan;
performing the second scan of a second plurality of electrodes along a second axis in the capacitive sense array to obtain a second plurality of capacitance values corresponding to the mutual capacitance at the electrode intersections of the capacitive sense array;
combining at least a portion of the obtained first plurality of capacitance values with at least a portion of the obtained second plurality of capacitance values to obtain a third plurality of capacitance values without a subsequent scan of electrodes in the capacitive sense array, the combining counteracting effects of common mode noise in the obtained capacitance values;
identifying a first subset of the first plurality of capacitance values and a second subset of the second plurality of capacitance values based on a third subset of the third plurality of capacitance values; and
determining, by a processing device, a first coordinate of a conductive object proximate to the capacitive sense array based on the first subset and a second coordinate of the conductive object based on the second subset.

2. The method of claim 1, wherein the third plurality of capacitance values are stored in a two dimensional matrix and the third subset of the third plurality of capacitance values comprises entries of the matrix with values greater than zero, and wherein the identifying comprises identifying entries of the matrix that are bound by rows and columns corresponding to the third subset.

3. The method of claim 1, wherein combining at least the portion of the first plurality of capacitance values with at least the portion of the second plurality of capacitance values to obtain the third plurality of capacitance values comprises:
determining whether a first capacitance value of the first plurality of capacitance values and a second capacitance value of the second plurality of capacitance values are greater than a threshold value; and
in response to determining that the first capacitance value and the second capacitance value are greater than the threshold value, combining the first capacitance value with the second capacitance value to obtain a third capacitance value, wherein the third plurality of capacitance values comprises the third capacitance value.

4. The method of claim 1, wherein combining at least the portion of the first plurality of capacitance values with at least the portion of the second plurality of capacitance values to obtain the third plurality of capacitance values further comprises:
determining that one of a first capacitance value of the first plurality of capacitance values and a second capacitance value of the second plurality of capacitance values is greater than a first threshold value and that one of the third plurality of capacitance values is greater than a second threshold value; and
in response to determination, combining the first capacitance value with the second capacitance value to obtain a third capacitance value, wherein the third plurality of capacitance values comprises the third capacitance value.

5. The method of claim 1, wherein performing the first scan comprises:
driving one or more of the second plurality of electrodes along the second axis with a transmit signal; and
measuring a receive signal from the first plurality of electrodes along the first axis.

6. The method of claim 1, wherein performing the second scan comprises:
driving one or more of the first plurality of electrodes along the first axis with a transmit signal; and
measuring a receive signal from the second plurality of electrodes along the second axis.

7. The method of claim 1, wherein the second scan is performed during a different period of time than the first scan and does not overlap in time with the first scan.

8. The method of claim 1, wherein determining the first coordinate and the second coordinate is further based on a touch position equation, from a plurality of touch position equations comprising at least one of a centroid equation or a linear interpolation equation.

9. An apparatus comprising:
a processing device coupled to a capacitive sense array, the processing device configured to:
perform a first scan of a first plurality of electrodes parallel to a first axis in the capacitive sense array to obtain a first plurality of capacitance values corresponding to a mutual capacitance at electrode intersections of the capacitive sense array;
after the first scan, switch one or more of the first plurality of electrodes from receive electrodes of the first scan to transmit electrodes of a second scan;
perform the second scan of a second plurality of electrodes parallel to a second axis in the capacitive sense array to obtain a second plurality of capacitance values corresponding to the mutual capacitance at the electrode intersections of the capacitive sense array;
combine at least a portion of the obtained first plurality of capacitance values with at least a portion of the obtained second plurality of capacitance values to obtain a third plurality of capacitance values without a subsequent scan of electrodes in the capacitive sense array, the combining counteracting effects of common mode noise in the obtained capacitance values;
identify a first subset of the first plurality of capacitance values and a second subset of the second plurality of capacitance values based a third subset of the third plurality of capacitance values; and
determine a first coordinate of a conductive object proximate to the capacitive sense array based on the first subset and a second coordinate of the conductive object based on the second subset.

10. The apparatus of claim 9, wherein the third plurality of capacitance values are stored in a two dimensional matrix and the third subset of the third plurality of capacitance values comprises entries of the matrix with values greater than zero, and wherein the identifying comprises identifying entries of the matrix that are bound by rows and columns corresponding to the third subset.

11. The apparatus of claim 9, wherein to combine at least the portion of the first plurality of capacitance values with at least the portion of the second plurality of capacitance values the processing device is configured to:
determine whether a first capacitance value of the first plurality of capacitance values and a second capacitance value of the second plurality of capacitance values are greater than a threshold value; and in response to determining that the first capacitance value and the second capacitance value are greater than the threshold value, combine the first capacitance value with the second capacitance value to obtain a third capacitance value, wherein the third plurality of capacitance values comprises the third capacitance value.

12. The apparatus of claim 9 wherein to combine at least the portion of the first plurality of capacitance values with at least the portion of the second plurality of capacitance values the processing device is further configured to:
   determine that one of a first capacitance value of the first plurality of capacitance values and a second capacitance value of the second plurality of capacitance values is greater than a first threshold value and that one of the third plurality of capacitance values is greater than a second threshold value; and
   in response to the determination, combine the first capacitance value to the second capacitance value to obtain a third capacitance value, wherein the third plurality of capacitance values comprises the third capacitance value.

13. The apparatus of claim 9, wherein to perform the first scan, the processing device is configured to:
   drive one or more of the second plurality of electrodes parallel to the second axis with a transmit signal; and
   measure a receive signal from the first plurality of electrodes parallel to the first axis.

14. The apparatus of claim 9, wherein to perform the second scan the processing device is configured to:
   drive one or more of the first plurality of electrodes parallel to the first axis with a transmit signal; and
   measure a receive signal from the second plurality of electrodes parallel to the second axis.

15. The apparatus of claim 9, wherein the second scan is performed during a different period of time than the first scan and does not overlap in time with the first scan.

16. The apparatus of claim 9, wherein determining the first coordinate and the second coordinate is further based on a touch position equation, from a plurality of touch position equations comprising at least one of a centroid equation or a linear interpolation equation.

17. An apparatus comprising:
   a touch-sensor device, the touch-sensor device comprising an array of capacitive sense elements, the array comprising a plurality of transmit electrodes and a plurality of receive electrodes;
   a transmit selection circuit coupled to the touch-sensor device, the transmit selection circuit to selectively apply a transmit signal to one or more of the transmit electrodes;
   a receive selection circuit coupled to the touch-sensor device, the receive selection circuit to selectively measure a signal from one or more of the receive electrodes, wherein the measured signal corresponds to a mutual capacitance value between a transmit electrode and a receive electrode; and
   a processing device coupled to the touch-sensor device, the processing device configured to:
      perform a first scan of a first plurality of electrodes aligned with a first axis in the capacitive sense array to measure a first plurality of capacitance values from the receive electrodes aligned with the first axis in the capacitive sense array;
      switch an orientation of the transmit and receive electrodes;
      perform a second scan of a second plurality of electrodes aligned with a second axis in the capacitive sense array to measure a second plurality of capacitance values from the receive electrodes aligned with the second axis in the capacitive sense array;
      combine at least a portion of the measured first plurality of capacitance values with at least a portion of the measured second plurality of capacitance values to obtain a third plurality of capacitance values without a subsequent scan of electrodes in the capacitive sense array, the combining counteracting effects of common mode noise in the measured capacitance values;
      identify a first subset of the first plurality of capacitance values and a second subset of the second plurality of capacitance values based on a third subset of the third plurality of capacitance values; and
      determine a first coordinate of a conductive object proximate to the capacitive sense array based on the first subset of the first plurality of capacitance values and a second coordinate of the conductive object based on the second subset of the second plurality of capacitance values.

18. The apparatus of claim 17, wherein the third plurality of capacitance values are stored in a two dimensional matrix and the third subset of the third plurality of capacitance values comprises entries of the matrix with values greater than zero, and wherein the identifying comprises identifying entries of the matrix that are bound by rows and columns corresponding to the third subset.

19. The apparatus of claim 17, wherein to combine at least the portion of the first plurality of capacitance values with at least the portion of the second plurality of capacitance values the processing device is configured to:
   determine whether a first capacitance value of the first plurality of capacitance values and a second capacitance value of the second group of capacitance values are greater than a threshold value; and
   in response to determining that the first capacitance value and the second capacitance value are greater than the threshold value, combine the first capacitance value with the second capacitance value to obtain a third capacitance value, wherein the third plurality of capacitance values comprises the third capacitance value.

20. The apparatus of claim 17 wherein to combine at least the portion of the first plurality of capacitance values with at least the portion of the second plurality of capacitance values the processing device is further configured to:
   determine that one of a first capacitance value of the first plurality of capacitance values and a second capacitance value of the second plurality of capacitance values is greater than a first threshold value and that one of the third plurality of capacitance values is greater than a second threshold value; and
   in response to the determination, combine the first capacitance value to the second capacitance value to obtain a third capacitance value, wherein the third plurality of capacitance values comprises the third capacitance value.

* * * * *